United States Patent Office

2,959,615
PREPARATION OF SUBSTITUTED SEMICARBAZIDES

David W. Lum and Irving L. Mador, Cincinnati, Ohio, assignors to National Distillers and Chemical Corporation, New York, N.Y., a corporation of Virginia No Drawing. Filed Oct. 9, 1957, Ser. No. 689,043

7 Claims. (Cl. 260—554)

This invention relates to a novel process for the preparation of substituted semicarbazides and salts thereof. More particularly, the invention pertains to the catalytic hydrogenation of substituted nitroso ureas to produce these semicarbazides compounds.

A number of different methods for preparing semicarbazides and their salts have been proposed in the prior art. Such methods have included electrolytic and chemical reduction of various nitrogen-containing compounds. In the former, expensive electrolytic equipment is required which results in high operating costs. While in the heretofore proposed chemical reduction processes extensive reaction control or product recovery systems were required in order to obtain high yields of the desired compounds substantially free of contaminating by-products.

One object of the present invention is to provide a commercial process for the direct preparation of substituted semicarbazides and salts thereof. Another object of the invention is to provide a process which avoids the difficulties encountered in the prior art processes. Other objects will become apparent from the ensuing description of the invention.

In accordance with this invention, it has been found that substituted nitroso ureas may be directly subjected to catalytic hydrogenation to prepare substituted semicarbazides under certain prescribed conditions. The reaction involved is believed to proceed according to the following equation:

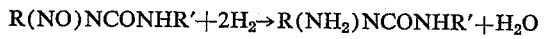

$$R(NO)NCONHR' + 2H_2 \rightarrow R(NH_2)NCONHR' + H_2O$$

wherein R is an alkyl group having from about 1 to 18 carbons, and R' is either R or hydrogen. R and R' may be either straight or branched chain alkyl groups, and the alkyl groups may be either the same or different. Such alkyl groups are methyl, ethyl, propyl, isopropyl, butyl, isobutyl, amyl, hexyl, heptyl, octyl, etc. In the preferred substituted nitroso urea feed material, R will be an alkyl group having from about 1 to 8 carbon atoms while R' will be hydrogen.

The hydrogenation catalysts useful for the purposes of this invention may be any one of the noble metal catalysts of group VIII of the periodic chart. The preferred catalysts, however, are platinum and palladium. The catalysts may be used in either an unsupported form or supported on such conventional carriers as carbon, silica gel, activated charcoal, alumina, etc.

In accordance with another feature of the invention, it has been found to be essential to carry out the hydrogenation in an acidic reaction medium having a pH of about 1 to 6, preferably about 2 to 4. The desired reaction medium may be formed by employing certain inorganic and organic acids in conjunction with non-acidic solubilizing agents such as water, methanol, ethanol, ethyl ether and mixtures thereof. It will be understood that conventional non-acidic solubilizing agents may be selected from alcohol, ether and hydrocarbon classes. The use of an acid is, however, important for the present purposes and exemplificative acids include citric, acetic, hydrochloric, sulfuric, phosphoric, formic, oxalic, etc. If the reaction is carried out in a neutral medium, hydrogenolysis rather than reduction takes place and alkyl urea is produced.

In order to maintain the prescribed pH, conventional buffer systems such as sodium acetate-acetic acid, sodium citrate-citric acid, sodium phosphate-phosphoric acid, etc., may be used. However, the use of a buffer is not an essential feature of the process of this invention, as shown in the embodiments described below.

The temperature required for the hydrogenation will range from about 0° to 100° C., though room or ambient temperatures may be employed effectively. The pressure, on the other hand, will be about 10 to 1000 p.s.i., preferably about 20 to 100 p.s.i., which may be varied by controlling the amount of hydrogen fed into the reaction system.

The invention will be more fully understood by reference to the following illustrative examples.

Example I 2.5 g. of nitrosomethylurea was dissolved in 150 ml. of methanol-water solution containing 10 g. of citric acid and enough sodium hydroxide to raise the pH to 2.75. This mixture was placed in a hydrogenation bomb with 0.5 g. platinum over carbon catalyst and hydrogenated at room temperature and at 30–50 lbs. pressure for 18 hours. On removal from the bomb the solution was filtered free of catalyst and the reduced product isolated as the benzaldehyde derivative. A yield of 1.36 g. of the benzaldehyde derivative was obtained or 32 percent of the theoretical yield based on starting nitrosomethylurea, having a melting point of 161–162° C. (literature value—162° C.).

Example II

A hydrogenation bomb was charged with 2.5 g. of nitrosomethylurea dissolved in 170 ml. of water, 4 ml. of concentrated hydrochloric acid and 0.5 g. of platinum over carbon catalyst. This mixture was then hydrogenated at 30–50 lbs. pressure at room temperature for two hours. On removal from the bomb the reaction mixture was filtered free of catalyst, and the reduced product isolated as the benzaldehyde derivative. A yield of 0.74 g. of the derivative was obtained or 17 percent based on starting nitrosomethylurea.

Example III 5 g. of nitrosomethylurea was dissolved in 140 ml. of methanol and 3 ml. of acetic acid added. This solution was then placed in a hydrogenation bomb with 0.5 g. of platinum over carbon catalyst and hydrogenated at 30–50 lbs. pressure at room temperature. After two hours the rate of hydrogen absorption had decreased appreciably and the reaction mixture was removed from the bomb and filtered. The filtrate was returned to the hydrogenation bomb with 6 additional ml. of acetic acid and 0.5 g. fresh catalyst and hydrogenated for 6 hours. After filtration the product was isolated as the benzaldehyde derivative from the filtrate. A yield of 1.76 g. was obtained or 20% based on nitrosomethylurea.

The above data show that the process of this invention provides a direct and effective method for the preparation of substituted semicarbazides and their salts by utilizing certain nitroso urea compounds as starting material. Though in the above examples, the substituted semicarbazides are recovered as the benzaldehyde derivatives, it will be understood that the substituted semicarbazides will initially be produced in the form of salts of the acid employed in the reaction mixture.

While this invention has been described and illustrated by the examples shown above, it is not intended to be

What is claimed is:

1. A method for preparing a semicarbazide which comprises hydrogenating a substituted nitroso urea having the formula

R(NO)NCONHR' wherein R is an alkyl group having from 1 to 8 carbon atoms and R' is selected from the group consisting of R and hydrogen, in the presence of a group VIII noble metal catalyst and an acidic reaction medium having a pH of 1 to 6.

2. The method of claim 1 wherein R' is hydrogen.
3. The method of claim 1 wherein said noble metal catalyst is platinum.
4. The method of claim 1 wherein said noble metal catalyst is palladium.
5. The method of claim 1 wherein said substituted nitroso urea is nitrosomethylurea.
6. The method of claim 1 wherein said acidic reaction medium has a pH of about 1 to 4.
7. The method of claim 1 wherein said acidic reaction medium comprises an acid and a non-acidic solubilizing agent selected from the group consisting of water, methanol, ethanol, ethyl ether and mixtures thereof.

References Cited in the file of this patent

UNITED STATES PATENTS

| | | |
|---|---|---|
| 2,717,200 | Hanford | Sept. 6, 1955 |
| 2,749,217 | Deutschman | June 5, 1956 |

OTHER REFERENCES

Vogelsang: Rec. Trav. Chim., vol. 62, pp. 5–11 (1943).

Frankenburg et al.: Advances in Catalysis, vol. VI, Academic Press, New York, p. 132 (1954).

Theilheimer: Synthetic Methods of Organic Chemistry, vol. 7, pp. 109–110 (item 276) (1953).